United States Patent
Cui et al.

(10) Patent No.: US 12,028,838 B2
(45) Date of Patent: Jul. 2, 2024

(54) BANDWIDTH PART AND TRANSMISSION CONFIGURATION INDICATION SWITCHING IN NON-TERRESTRIAL NETWORKS

(71) Applicant: Apple Inc., Cupertino, CA (US)

(72) Inventors: Jie Cui, San Jose, CA (US); Yang Tang, Cupertino, CA (US); Qiming Li, Beijing (CN); Chunxuan Ye, San Diego, CA (US); Dawei Zhang, Saratoga, CA (US); Hong He, Cupertino, CA (US); Huaning Niu, San Jose, CA (US); Manasa Raghavan, Sunnyvale, CA (US); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 17/438,896

(22) PCT Filed: Jan. 14, 2021

(86) PCT No.: PCT/CN2021/071790
§ 371 (c)(1),
(2) Date: Sep. 13, 2021

(87) PCT Pub. No.: WO2022/151167
PCT Pub. Date: Jul. 21, 2022

(65) Prior Publication Data
US 2022/0377719 A1    Nov. 24, 2022

(51) Int. Cl.
*H04W 72/044*  (2023.01)
*H04W 72/23*   (2023.01)
(Continued)

(52) U.S. Cl.
CPC ......... *H04W 72/044* (2013.01); *H04W 72/23* (2023.01); *H04W 76/10* (2018.02); *H04W 84/06* (2013.01)

(58) Field of Classification Search
CPC ... H04W 72/044; H04W 76/10; H04W 72/23; H04W 72/0453; H04W 84/06; H04B 7/0695; H04L 5/0092; H04L 5/0007
See application file for complete search history.

(56) References Cited

U.S. PATENT DOCUMENTS

2019/0044689 A1\*  2/2019  Yiu .................. H04W 72/23
2020/0128546 A1   4/2020  Shi et al.
(Continued)

OTHER PUBLICATIONS

International Search Report for PCT Patent Application No. PCT/CN2021/071790; mailed Oct. 14, 2021.
(Continued)

*Primary Examiner* — Oussama Roudani
(74) *Attorney, Agent, or Firm* — Kowert, Hood, Munyon, Rankin & Goetzel, P.C.

(57) ABSTRACT

A wireless device may establish communication with a network node and determine a relationship between transmission configuration indication (TCI) and bandwidth part (BWP). The wireless device may then receive an indication of one of TCI or BWP from the network node followed by determining the other of TCI or BWP based on the indication and using the relationship between the TCI and BWP. Finally, the wireless device may perform downlink communication using the indicated one of TCI or BWP and determined other TCI or BWP. The network node may be comprised in a non-terrestrial network and may specify via RRC signaling the relationship between TCI and BWP for the wireless device. The indication of the TCI or BWP may be provided by downlink control information (DCI),
(Continued)

medium access control (MAC) control element (CE), an inactivity timer, or RRC reconfiguration commands.

20 Claims, 7 Drawing Sheets

(51) Int. Cl.
*H04W 76/10* (2018.01)
*H04W 84/06* (2009.01)

(56) References Cited

U.S. PATENT DOCUMENTS

| | | |
|---|---|---|
| 2020/0145158 A1* | 5/2020 | Zhou .................. H04L 5/0044 |
| 2020/0313729 A1* | 10/2020 | Zhou .................. H04W 72/046 |
| 2020/0313831 A1* | 10/2020 | Kim .................... H04L 5/001 |
| 2020/0351069 A1 | 11/2020 | Grant et al. |
| 2021/0314953 A1* | 10/2021 | Park .................... H04W 76/11 |
| 2022/0408470 A1* | 12/2022 | Jung .................... H04W 72/23 |

OTHER PUBLICATIONS

Asustek "Remaining issue for TCI field"; 3GPP TSG RAN WG1 #100bis e-Meeting R1-2002484; Apr. 20-30, 2020.

* cited by examiner

BANDWIDTH PART AND TRANSMISSION CONFIGURATION INDICATION SWITCHING IN NON-TERRESTRIAL NETWORKS

PRIORITY CLAIM INFORMATION

This application is a national stage application of International Application No. PCT/CN2021/071790, filed on Jan. 14, 2021, titled "Bandwidth Part and Transmission Configuration Indication Switching in Non-Terrestrial Networks", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to methods, apparatuses, and systems for a wireless device communicating with a non-terrestrial network and performing bandwidth part and transmission configuration indication switching.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

Increased reliability in these communication systems are desirable.

SUMMARY

Embodiments are presented herein of methods, apparatuses, and systems for a wireless device communicating with a non-terrestrial network and performing bandwidth part and transmission configuration indication switching.

The wireless device may establish communication with a network node and determine a relationship between transmission configuration indication (TCI) and bandwidth part (BWP). The wireless device may then receive an indication of one of TCI or BWP from the network node followed by determining the other of TCI or BWP based on the indication and using the relationship between the TCI and BWP. Finally, the wireless device may perform downlink communication using the indicated one of TCI or BWP and determined other TCI or BWP.

In some embodiments, the network node may be comprised in a non-terrestrial network and may further specify the relationship between TCI and BWP for the wireless device. Additionally, or alternatively, the relationship between TCI and BWP for the wireless device may be specified by RRC signaling. In some embodiments, the indication of the TCI or BWP may be provided by downlink control information (DCI), medium access control (MAC) control element (CE), an inactivity timer, or RRC reconfiguration commands. In some embodiments, upon receiving the indication of TCI, the wireless device may be configured to determine the BWP based on said indication and relationship between the TCI and BWP. Conversely, upon receiving the indication of BWP, the wireless device may be configured to determine the TCI based on said indication and relationship between BWP and TCI.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

DETAILED DESCRIPTION OF THE EMBODIMENTS

Acronyms

Figure 1:
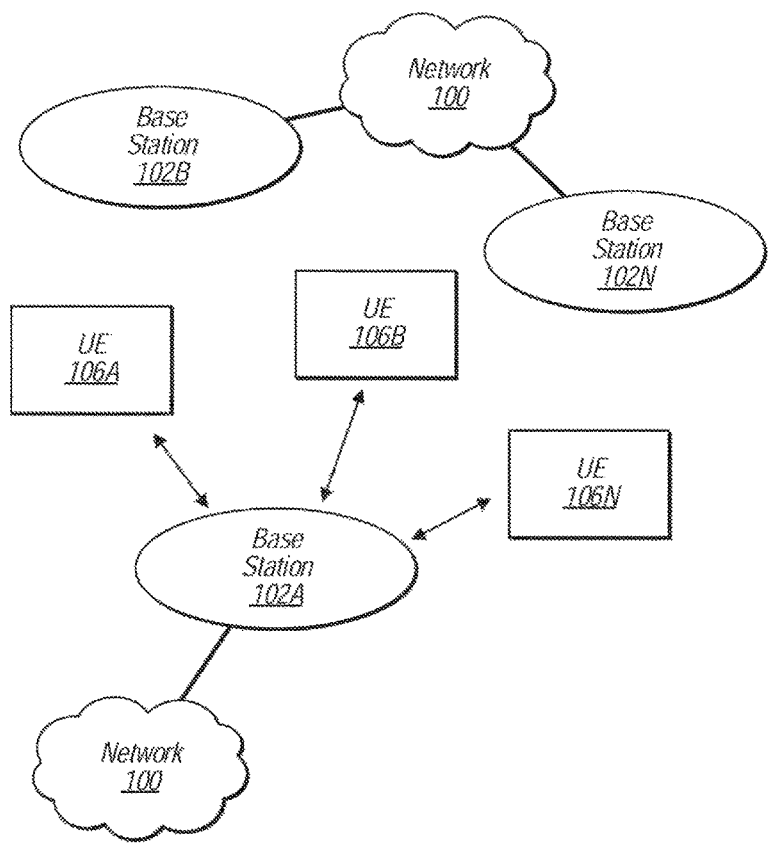
FIG. 1 illustrates an example wireless communication system, according to some embodiments.

The following acronyms are used in the present Patent Application:
UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
EPC: Evolved Packet Core
MME: Mobile Management Entity
RRC: Radio Resource Control
NTN: Non-Terrestrial Network
BWP: Bandwidth Part
TCI: Transmission Configuration Indicator
FDM: Frequency Division Multiplexing
SSB: Synchronization Signal Block
MAC: Medium Access Control
CE: Control Element
DCI: Downlink Control Information
QCL: Quasi-Colocated
PDCCH: Physical Downlink Control Channel
PDSCH: Physical Downlink Shared Channel
DL: Downlink
RSRP: Reference Signal Receive Power
L1: Layer-1
HARQ: Hybrid Automatic Repeat Request
NR: New Radio

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
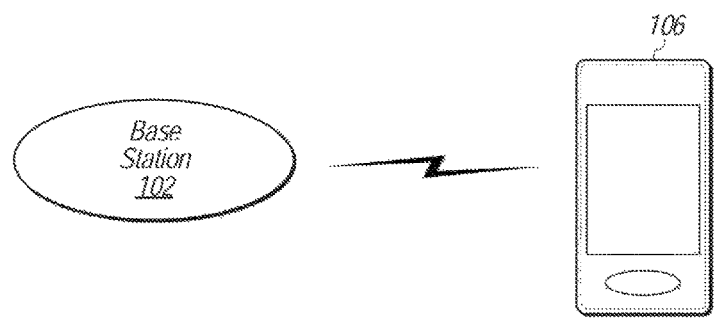
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
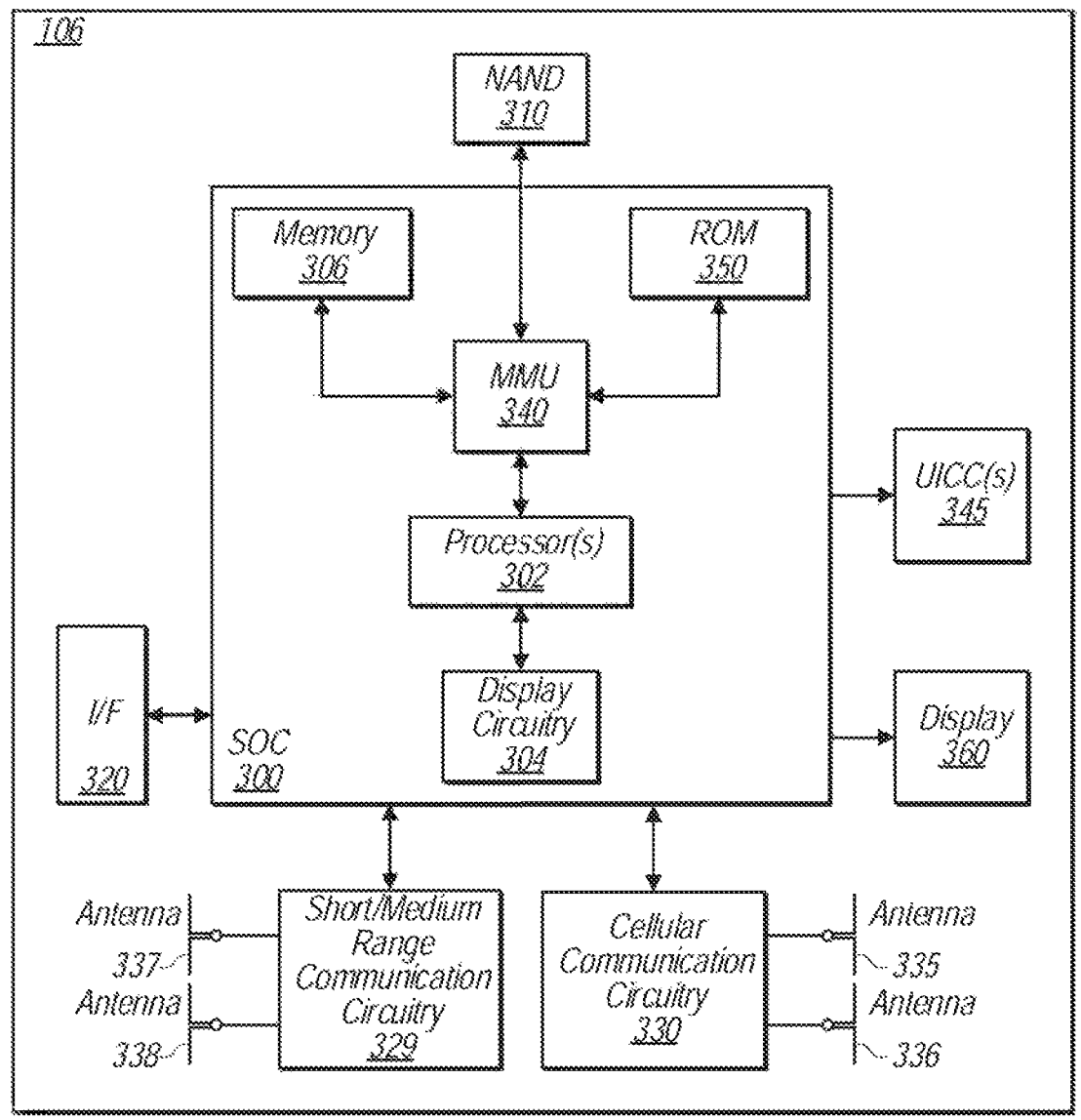
FIG. 3 illustrates an example block diagram of a UE. according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively: directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to so perform the functions of short range wireless communication circuitry 329. In addition, each integrated circuit may include circuitry (e.g., first circuitry, second circuitry, etc.) configured to perform the functions of short range wireless communication circuitry 329.

Figure 4:
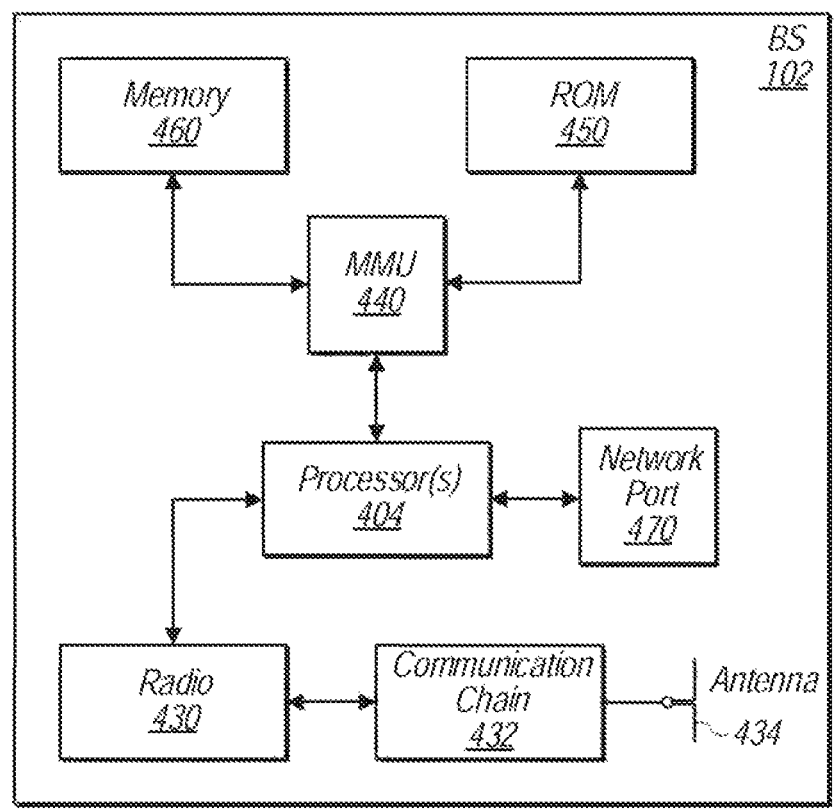
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
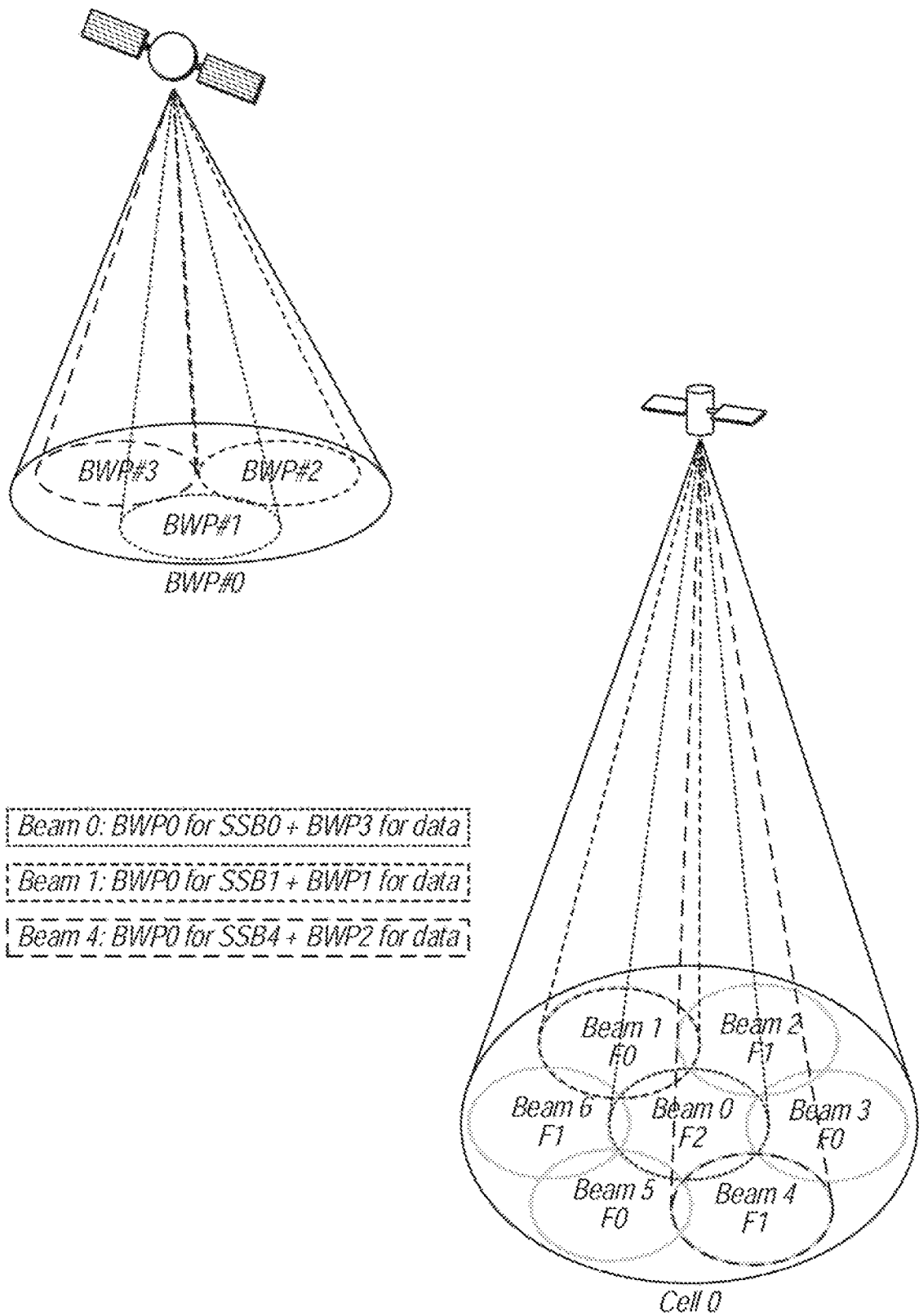
FIG. 5 illustrates NR beam management system and a non-terrestrial network beam management system, according to some embodiments.

FIG. 5—NR and Non-Terrestrial Network Beam Management Systems

Due to the mobility and coverage of satellites, beam management techniques differ significantly between NR systems and non-terrestrial network (NTN) systems involving satellites. Different satellite beams may cover different areas on the ground and different beams may be used for different BWPs. In some embodiments, different beams from the satellite may be frequency division multiplexed (FDMed) in the frequency domain. Accordingly, the satellite beams could be operated in different ways such as a single cell with multiple beams or singular beams each associated with a single cell. For example, Cell 0 in FIG. 5 may comprise multiple beams (0 through 6). Additionally, each beam may be associated with a specific BWP. For example, Beam 0 may be associated with BWP0 for Synchronization Signal Block 0 (SSB0) and BWP3 for data transmissions, Beam 1 may be associated with BWP0 for SSB1 and BWP1 for data transmissions, and Beam 4 may be associated with BWP0 for SSB4 and BWP2 for data transmissions. In these scenarios, the beam switching (e.g., TCI switching) would occur with the BWP switching at the UE. In some embodiments, the beam switching could be indicated by the network and the UE may determine the corresponding BWP switch; alternatively, the network may indicate the BWP switch, and the UE may determine the corresponding beam switching.

Figure 6:
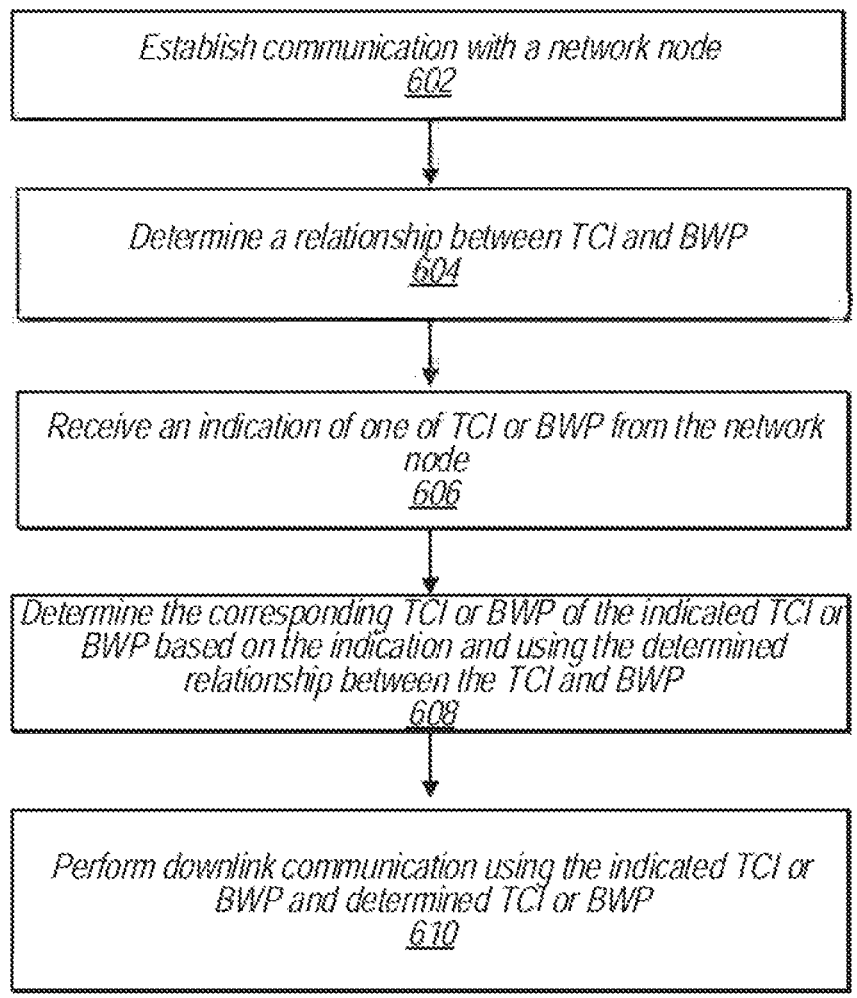
FIG. 6 is a flowchart illustrating an example procedure for BWP and TCI switching in a non-terrestrial network, according to some embodiments.

FIG. 6—Example Procedure for BWP and TCI Switching

FIG. 6 is a flowchart illustrating an example procedure for BWP and TCI switching, e.g., in a non-terrestrial network, according to some embodiments.

Aspects of the method of FIG. 6 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In step 602, the UE may establish communication with a network node. The communications may include radio resource control (RRC) signaling, MAC CE content, downlink control information (DCI), and/or other signaling. In some embodiments, the network node may be a base station or transmission reception point (TRP) in a cellular network. Alternatively, or additionally, in some embodiments, the network node may be comprised in a non-terrestrial network (NTN). For example, the network node may comprise a satellite.

In step 604, the UE may then determine a relationship between one or more beam configurations (e.g., indicated by transmission configuration indicator(s) (TCIs), and one or more corresponding bandwidth parts (BWPs). For example, a certain TCI may be specified (via the network) to have a certain BWP that corresponds to said certain TCI. In other words, TCI #2 may be configured by the network to correspond to BWP #0 and/or vice versa (e.g., BWP #0 may be configured to correspond to TCI #2). Accordingly, other TCIs may have configured relationships corresponding to other BWPs (e.g., TCI #1 may be configured to correspond to BWP #4). In some embodiments, this relationship between the TCI(s) and BWP(s) may be preconfigured at the UE through RCC signaling from the network node or from the network generally. Additionally, the relationship between the TCI(s) and BWP(s) may be reconfigured by the network node through an RRC reconfiguration command.

In some embodiments, a certain TCI may have a predefined relationship based on index mapping. For example, TCI #2 may always correspond to a certain BWP such as BWP #0 based on said index mapping. Moreover, in some embodiments, certain TCIs may have initial or default predefined relationships with certain BWPs as previously described with regard to being based on index mapping. However, the network may be able to reconfigure these relationships in order to change them from said initial or default relationships to new or desired TCI and BWP relationships.

In step 606, the UE may receive an indication of one of TCI or BWP from the network node. In other words, network may transmit signaling to the UE which indicates a certain TCI or alternatively a certain BWP. In some embodiments, this indicated TCI or BWP may be a target TCI or target BWP that the network wishes to utilize rather than the current TCI or BWP being utilized by the UE. The target TCI or target BWP may be the same or different than the current TCI or current BWP that the UE is utilizing for network communications. For example, the network may wish to switch from BWP #0 to BWP #3 in which case the network may indicate (to the UE) the target BWP (BWP #3) to switch to from the current BWP (BWP #0). Additionally, or alternatively, the network may wish to switch from TCI #0 to TCI #3 in which case the network could indicate (to the UE) the target TCI (TCI #3) to switch to from the current TCI (TCI #0).

In step 608, the UE may determine an other TCI or BWP corresponding to the indicated target TCI or target BWP from the network and furthermore may base this determination on the already determined TCI and BWP relationship. In other words, as previously described with regard to 604, the UE may be aware of particular relationships between BWPs and TCIs. However, these particular relationships between the indicated target BWPs or TCIs and other BWPs or TCIs may not be explicitly specified by the indication discussed in step 606. In other words, the other BWPs or TCIs (which may correspond to the indicated target BWPs or TCIs) may not be indicated by the network node. In some embodiments, these relationships may have been preconfigured at the UE through RCC signaling from the network node or reconfigured by the network node through an RRC reconfiguration command (e.g., as discussed in 604). Having awareness of these particular relationships may allow the UE to determine the corresponding other TCIs or BWPs of the indicated target TCIs or BWPs. For example, in the scenario described above (with regard to step 606) in which the network wishes the UE to switch from BWP #0 to BWP #3, the UE may be aware of TCI relationships concerning the current BWP (BWP #0) and target BWP (BWP #3). For example, current BWP (BWP #0) may correspond to current TCI (TCI #2) and target BWP (BWP #3) may correspond to target TCI (TCI #0). Thus, knowing these relationships, the UE may determine the corresponding target TCI from the indication of the target BWP and the determined relationship between the target TCI and target BWP. On the other hand, if the network wishes to switch from TCI #0 to TCI #3, the UE may be aware of BWP relationships concerning the current TCI (TCI #0) and target TCI (TCI #3). For example, the current TCI (TCI #0) may correspond to current BWP (BWP #2) and target TCI (TCI #3) may correspond to target BWP (BWP #0). Thus, knowing these relationships, the UE may determine the corresponding target BWP from the indication of the target TCI and the determined relationship between the target BWP and target TCI.

In step 610, the UE may then perform downlink communications using the indicated one of TCI or BWP and determined other TCI or BWP. In other words, having determined the corresponding target TCI for the target BWP, the UE may then switch to using the target BWP and target TCI rather than the previously used BWP and TCI. Conversely, having determined the corresponding target BWP for the indicated target TCI, the UE may then switch to using the target TCI and target BWP rather than the previously used TCI and BWP. In performing this switch, the UE may then resume communications with the network using the new BWP and TCI.

Figure 7:
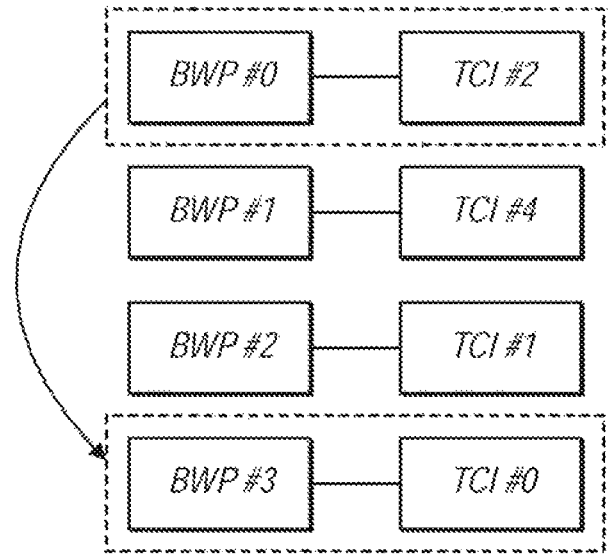
FIGS. 7 and 8 illustrate examples of BWP and TCI switching, according to some embodiments.
Figure 8:
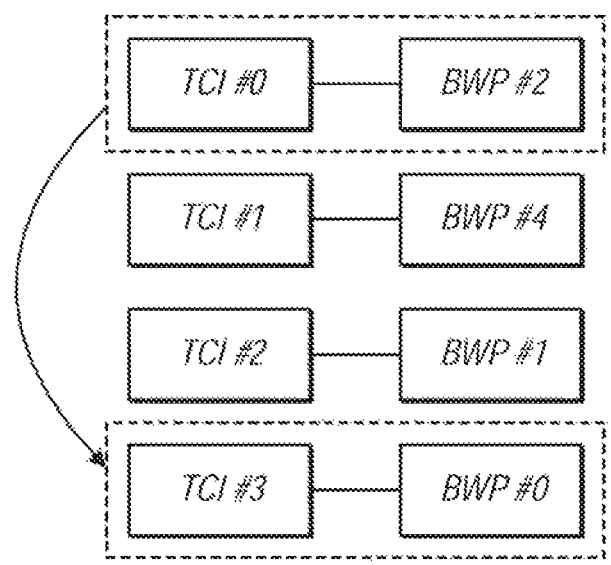

FIGS. 7 and 8—DCI Based BWP and TCI Switching

FIGS. 7 and 8 illustrate DCI based BWP and TCI switching, according to some embodiments. As noted above, the described embodiments may apply to a non-terrestrial network.

In some embodiments, the network may preconfigure the relationship between BWP (bandwidth part) and TCI (transmission configuration indication) to the user equipment (UE), e.g., using radio resource control (RRC) communications. Accordingly, the network may be able to use, e.g., a single, downlink control information (DCI) to indicate the active BWP switching for the UE. For example, the network may transmit a DCI to the UE to indicate a target BWP for the UE. The UE may then switch the current BWP to the target BWP which would also trigger the UE to switch the current TCI to the target TCI (which is associated with the target BWP) based on the determined relationship between BWP and TCI. For example, as illustrated in FIG. 7, a UE may have been preconfigured by the network to have certain specified relationships/sets of associated BWPs and TCIs. The UE may then receive an indication of a target BWP (BWP #3, associated with TCI #0) via a DL command from the network (e.g., in DCI). Upon receiving this, the UE may use the preconfigured relationship of the target BWP to determine the target TCI that is associated with the target BWP. Accordingly, the indication of the new target BWP may cause the UE to change the current BWP (BWP #0, associated with TCI #2) to the target BWP (BWP #3) and implicitly the TCI would also be changed from the current TCI (TCI #2) to the target TCI (TCI #0, associated with target BWP #3) based on the prior determined relationship.

In doing so, there may be a procedural delay from when the UE received the DCI. For example, if the UE received the DCI at slot n, the UE may be able to receive the DL channels with the target TCI state and the target BWP of the serving cell on which the TCI state and BWP switch occurs after some delay. In other words, there is a delay before the TCI or BWP switch can occur and can vary from embodiment to embodiment.

For example, in a first embodiment, this delay may involve the UE receiving the DL target TCI and BWP at the first slot that is after slot n+Max{$T_{BWPswitchDelay}$, timeDurationForQCL}, where $T_{BWPswitchDelay}$ is the BWP switch delay and timeDurationForQCL is the time required by the UE to perform PDCCH reception and applying spatial quasi-colocation (QCL) information received in DCI.

In a second embodiment, the UE may receive the DL target TCI and BWP at the first slot that is after slot n+$T_{BWPswitchDelay\_NTN}$, where $T_{BWPswitchDelay\_NTN}$ is the BWP and TCI switching delay and an extended variable added to existing $T_{BWPswitchDelay}$. In other words, $T_{BWPswitchDelay\_NTN}$=x+$T_{BWPswitchDelay}$, where x is a non-negative variable (e.g., x≥0).

In a third embodiment, the UE may receive the DL target TCI and BWP at the first slot that is after slot n+timeDurationForQCL_NTN, where timeDurationForQCL_NTN is the time required by the UE to perform PDCCH reception and applying spatial QCL information received in DCI for NTN and is an extended variable added to existing timeDurationForQCL. In other words, timeDurationForQCL$_{NTN}$=y+timeDurationForQCL, where y is a non-negative variable (e.g., y≥0).

In a fourth embodiment, the UE may receive the DL target TCI and BWP at the first slot that is after slot n+$T_{BWPswitchDelay}$+timeDurationForQCL, where timeDurationForQCL is the time required by the UE to perform PDCCH reception and applying spatial QCL information received in DCI.

Alternatively, the network may preconfigure the relationship between BWP and TCI (rather than TCI to BWP in the example of FIG. 7) to the UE before RRC communication and use, e.g., a single DCI, to indicate the active TCI switching for the UE. In other words, the UE may receive a DCI command that may indicate a target TCI for the UE to switch to. The UE may then switch the current TCI to the target TCI and accordingly switch the current BWP to the target BWP associated with the target TCI. For example, as illustrated in FIG. 8, a UE may have been preconfigured by the network to have certain specified relationships/sets of associated to TCIs and BWPs. The UE may then receive an indication of a target TCI (TCI #3, associated with BWP #0) via a DL command from the network. Upon receiving this, the UE may use the preconfigured relationship of the target TCI to determine the target BWP that is associated with the target TCI. Accordingly, the DCI command may cause the UE to change the current TCI (TCI #0, associated with BWP #2) to the target TCI (TCI #3) and in effect the BWP would also be changed from the current BWP (BWP #2) to the target BWP (BWP #0, associated with target TCI #3).

In this case, the procedural delays may be similar to those previously described with regard to DCI indicating a target BWP to the UE. Moreover, in non-terrestrial networks, the DCI based TCI switching may be extended to PDSCH only or both PDCCH and PDSCH, as desired.

FIGS. 7 and 8—RRC Based BWP and TCI Switching

FIGS. 7 and 8 also illustrate RRC based BWP and TCI switching, e.g., in a non-terrestrial network, according to some embodiments.

In some embodiments, the network may use a single RRC reconfiguration to reconfigure the active BWP switching for the UE. In other words, a UE may be reconfigured by the network using a RRC reconfiguration command to specify certain relationships/sets of associated BWPs and TCIs in addition to triggering a switch from the current BWP and TCI state to a target BWP and TCI state. For example, as shown in FIG. 7, the UE may receive a RRC reconfiguration command from the network to reconfigure the current BWP (BWP #0) to a target BWP (BWP #3). Additionally, the RRC reconfiguration command may also specify relationships between current and target BWPs and TCIs. For example, as shown in FIG. 10, current BWP (BWP #0) may be specified to have a relationship associated with TCI #2 and target BWP (BWP #3) may be specified to have a relationship associated with TCI #0. Upon receiving this RRC reconfiguration command, the UE may then use the reconfigured relationships of the target BWP to determine the target TCI that is associated with the target BWP. Accordingly, the RRC reconfiguration command may also cause the UE to switch the current BWP (BWP #2, associated with current TCI #0) to the target BWP (BWP #3) and in effect the TCI would also be changed from the current TCI (TCI #2) to the target TCI (TCI #0, associated with target BWP #3).

Conversely, in another embodiment as shown in FIG. 8, the UE may receive a RRC reconfiguration command from the network to reconfigure the current TCI (TCI #0) to a target TCI (TCI #3). Upon receiving this RRC reconfiguration command, the UE may then use the reconfigured relationships of the target TCI to determine the target BWP that is associated with the target TCI. Accordingly, the RRC reconfiguration command may cause the UE to switch the current TCI (TCI #2, associated with current BWP #0) to the target TCI (TCI #3) and in effect the BWP would also be changed from the current BWP (BWP #2) to the target BWP (BWP #0, associated with target TCI #3).

In doing so, there may be a procedural delay from when the UE received RRC reconfiguration command and performing the BWP and TCI switching. For example, if the UE received the RRC reconfiguration command at slot n, the UE may receive the DL channels with the target TCI state and the target BWP of the serving cell on which the TCI state and BWP switch occurs after some delay. In other words, there is a delay before the BWP switch can occur and can vary from embodiment to embodiment.

For example, in a first embodiment, when the target TCI is known, this delay may involve the UE receiving the DL target TCI and BWP at the first slot that is after slot $$n + T_{RRC\_processing} \over NR\ slot\ length} + \frac{\text{Max}\{T_{BWPswitchDelayRRC}, TO_k(T_{first-SSB} + T_{SSB-proc})\}}{NR\ slot\ length}.$$

Conversely, in a second embodiment, if the target TCI is unknown, the UE may receive the DL target TCI and BWP at the first slot that is after slot $$n + T_{RRC\_processing} \over NR\ slot\ length} +$$
$$\frac{\text{Max}\{T_{BWPswitchdelayRCC}, T_{L1-RSRP} + TO_{uk}(T_{first-SSB} + T_{SSB-proc})\}}{NR\ slot\ length}.$$

In a third embodiment, when the target TCI is known, this delay may involve the UE receiving the DL target TCI and BWP at the first slot that is after slot $$n + T_{RRC\_processing} \over NR\ slot\ length} + \frac{\{T_{BWPswitchDelayRRC} + TO_k(T_{first-SSB} + T_{SSB-proc})\}}{NR\ slot\ length}.$$

Conversely, in a fourth embodiment, if the target TCI is unknown, this delay may involve the UE receiving the DL target TCI and BWP at the first slot that is after slot $$n + T_{RRC\_processing} \over NR\ slot\ length} +$$
$$\frac{\{T_{BWPswitchDelayRRC} + T_{L1-RSRP} + TO_{uk}(T_{first-SSB} + T_{SSB-proc})\}}{NR\ slot\ length}.$$

In these previously described embodiments of RRC based BWP and TCI switching, $T_{RRC\_processing}$ is the length of the RRC procedure delay, $T_{BWPswitchDelayRRC}$ is the time used by the UE to perform the BWP switch, $T_{first-SSB}$ is a time to first SSB transmission after RRC processing by the UE, $T_{SSB-proc}$ may be approximately 2 milliseconds, $TO_k$ has a value of 1 if the target state is not in the active state list for PDSCH and has a value of 0 otherwise, $T_{L1-RSRP}$ is the time required for an L1-RSRP measurement for receiving beam refinement, and $TO_{uk}$ has a value of 1 for CSI-RS based L1-RSRP measurements or when the TCI state switching involves QCL types other than QCL-TypeD and has a value of 0 for SSB based L1-RSRP measurement when the TCI state switching involves QCL-TypeD.

Alternatively, the network may use a single RRC reconfiguration to reconfigure the active TCI switching for the UE. In other words, a UE may be reconfigured by the network using a RRC reconfiguration command to specify certain relationships/sets of associated BWPs and TCIs in addition to triggering a switch from the current TCI state to a target TCI state. For example, as shown in FIG. 12, the UE may receive a RRC reconfiguration command from the network to reconfigure the current TCI (TCI #0) to a target TCI (TCI #3). Additionally, the RRC reconfiguration command may also specify relationships between current and target TCIs and BWPs. For example, as shown in FIG. 10, current TCI (TCI #0) may be specified to have a relationship associated with BWP #2 and target TCI (TCI #3) may be specified to have a relationship associated with BWP #0. Upon receiving this RRC reconfiguration command, the UE may then use the reconfigured relationships of the target BWP to determine the target BWP that is associated with the target TCI. Accordingly, the RRC reconfiguration command may also cause the UE to switch the current TCI (TCI #2, associated with current BWP #0) to the target TCI (TCI #3) and in effect the BWP would also be changed from the current BWP (BWP #2) to the target BWP (BWP #0, associated with target TCI #3). In this scenario, the procedural delays would be similar to the ones previously described with regard to RRC reconfiguration command indicating a target BWP to the UE.

Moreover, in another embodiment, the network may use a RRC reconfiguration command to reconfigure the relationships between BWPs and TCI for the UE. In other words, the network may use RRC reconfiguration commands to specify new relationships between BWPs and TCIs. For example, the network may transmit a RRC reconfiguration command to specify that current BWP #0 (as shown in FIG. 10), should be associated with a different TCI other than TCI #2 that it is currently associated with. Accordingly, these RRC reconfigurations of BWP and TCI relationships would be subject to similar procedural delays as previously described with regard to RRC reconfiguration command indicating a target BWP or target TCI to the UE.

FIG. 8—MAC CE Based BWP and TCI Switching

FIG. 8 illustrates MAC CE based BWP and TCI switching in a non-terrestrial network, according to some embodiments.

In some embodiments, the network may preconfigure the relationships between certain BWPs (bandwidth parts) and TCIs (transmission configuration indications) to the user equipment (UE), e.g., using radio resource control (RRC) communications. The network may also be able to use a single medium access control (MAC) control element (CE) to indicate the active TCI switching for the UE. In other words, the network may transmit a MAC CE command to the UE to indicate a target TCI for the UE. The UE may then switch the current TCI to the target TCI which would also trigger the UE to switch the current BWP to the target BWP (which is associated with the indicated target TCI). For example, as illustrated in FIG. 8, a UE may have been preconfigured by the network to have certain specified relationships/sets of associated BWPs and TCIs. The UE may then receive an indication of a target TCI (TCI #3, associated with BWP #0) via a MAC CE command from the network. Upon receiving this, the UE may use the preconfigured relationship of the target TCI to determine the target BWP that is associated with the target TCI. Accordingly, the MAC CE command may cause the UE to change the current TCI (TCI #0, associated with BWP #2) to the target TCI (TCI #3) and in effect the BWP would also be changed from the current BWP (BWP #2) to the target BWP (BWP #0, associated with target TCI #3). Moreover, in non-terrestrial networks, the MAC CE based TCI switching may be extended to PDCCH transmissions only or both PDCCH and PDSCH transmissions.

In performing MAC CE based TCI switching, there may be a delay from when the UE received MAC CE to actually performing the TCI switching procedure. For example, if the UE received the MAC CE at slot n, the UE may be able to receive the DL channels with the target TCI state and the target BWP of the serving cell on which the TCI state and BWP switch occurs after some delay. In other words, there is a delay before the BWP switch can occur and can vary from embodiment to embodiment.

For example, in a first embodiment, when the target TCI is known, this delay may involve the UE receiving the DL target TCI and BWP at the first slot that is after slot $$n + T_{HARQ} + 3N_{slot}^{subframe,\mu} + \text{Max}\left\{T_{BWPswitchDelay}, TO_k * \frac{(T_{first-SSB} + T_{SSB-proc})}{NR\ \text{slot length}}\right\}.$$

In a second embodiment, when the target TCI is unknown, the UE may receive the DL target TCI and BWP at the first slot that is after slot $$n + T_{HARQ} + 3N_{slot}^{subframe,\mu} + \text{Max}\left\{T_{BWPswitchDelay}, \left(T_{L1-RSRP} + TO_{uk} * \frac{(T_{first-SSB} + T_{SSB-proc})}{NR\ \text{slot length}}\right)\right\}.$$

In a third embodiment, when the target TCI is known, this delay may involve the UE receiving the DL target TCI and BWP at the first slot that is after slot $$n + T_{HARQ} + 3N_{slot}^{subframe,\mu} + T_{BWPswitchDelay}, +TO_k * \frac{(T_{first-SSB} + T_{SSB-proc})}{NR\ \text{slot length}}.$$

In a fourth embodiment, when the target TCI is unknown, the UE may receive the DL target TCI and BWP at the first slot that is after slot $$n + T_{HARQ} + 3N_{slot}^{subframe,\mu} + T_{BWPswitchDelay} + \left(T_{L1-RSRP} + TO_{uk} * \frac{(T_{first-SSB} + T_{SSB-proc})}{NR\ \text{slot length}}\right)$$

In these previously described embodiments of MAC CE based BWP and TCI switching, $T_{HARQ}$ is the timing between DL data transmission and acknowledgement, $3N_{slot}^{subframe,\mu}$ may be approximately equal to 3 milliseconds, $T_{BWPswitchDelay}$ is the time used by the UE to perform the BWP switch, $T_{first-SSB}$ is a time to first SSB transmission after MAC CE processing by the UE, $T_{SSB-proc}$ may be approximately equal to 2 milliseconds, $TO_k$ has a value of 1 if the target state is not in the active state list for PDSCH and has a value of 0 otherwise, $T_{L1-RSRP}$ is the time required for an L1-RSRP measurement for receiving beam refinement, and $TO_{uk}$ has a value of 1 for CSI-RS based L1-RSRP measurements or when the TCI state switching involves QCL types other than QCL-TypeD and has a value of 0 for SSB based L1-RSRP measurement when the TCI state switching involves QCL-TypeD.

Figure 9:
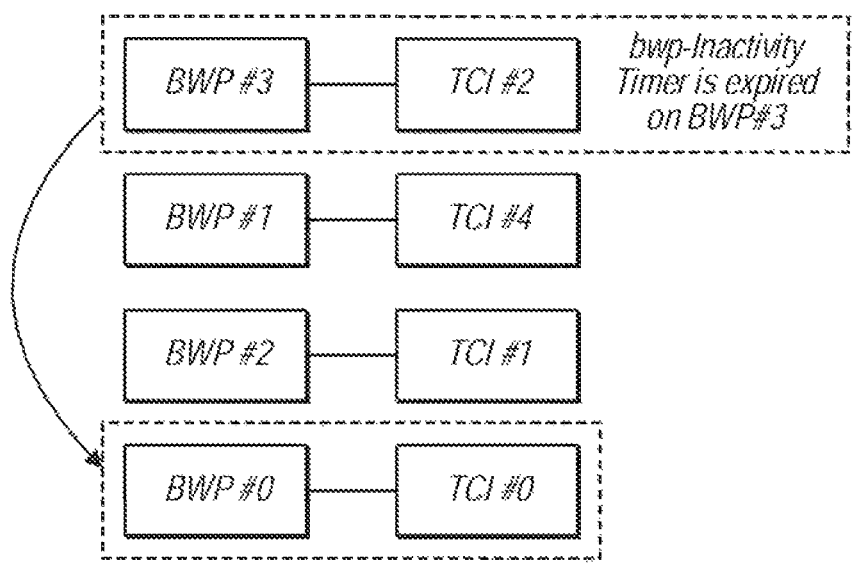
FIG. 9 illustrates an example of timer-based BWP and TCI switching, according to some embodiments; and While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

FIG. 9—Timer-Based BWP and TCI Switching

FIG. 9 illustrates timer-based BWP and TCI switching in a non-terrestrial network, according to some embodiments.

In some embodiments, the network may preconfigure the relationship between BWP (bandwidth part) and TCI (transmission configuration indication) to the user equipment (UE) before radio resource control (RRC) communications. Additionally, the network may also configure a timer associated with the active or current BWP for the UE. This timer (e.g., bwp-InactivityTimer) may be based on when the UE starts the BWP switch at slot n, e.g., DL slot n, where slot n is the first slot of a DL subframe (FR1) or DL half-subframe (FR2) immediately after a BWP-inactivity timer (bwp-InactivityTimer) expires on a serving cell. Accordingly, after the timer has expired, the UE may switch the current BWP to a target BWP and implicitly also switch the current TCI to the target TCI which is associated with the target BWP. For example, as illustrated in FIG. 9, a UE may have been preconfigured by the network to have certain specified relationships/sets of associated BWPs and TCIs. Upon expiry of the timer associated with current BWP #3, the UE may use the preconfigured relationship of the target BWP to determine the target TCI (TCI #0) that is associated with the target BWP (BWP #0). Accordingly, the expiration of the timer may cause the UE to change the current BWP (BWP #3, associated with TCI #2) to the target BWP (BWP #0) and in effect the TCI would also be changed from the current TCI (TCI #2) to the target TCI (TCI #0, associated with target BWP #0).

In doing so, there may be a procedural delay from when the bwp-InactivityTimer expired and the UE switching from the current BWP and TCI to the target BWP and target TCI. For example, if the UE received the DCI at slot n, the UE may be able to receive the DL channels with the target TCI state and the target BWP of the serving cell on which the TCI state and BWP switch occurs after some delay. In other words, there is a delay before the BWP switch can occur and can vary from embodiment to embodiment.

For example, in a first embodiment, this delay may involve the UE receiving the DL target TCI and BWP at the first slot that is after slot n+Max{$T_{BWPswitchDelay}$, timeDurationForQCL}, where $T_{BWPswitchDelay}$ is the BWP switch delay and timeDurationForQCL is the time required by the UE to perform PDCCH reception and applying spatial QCL information received in DCI.

In a second embodiment, the UE may receive the DL target TCI and BWP at the first slot that is after slot n+$T_{BWPswitchDelay\_NTN}$, where $T_{BWPswitchDelay\_NTN}$ is the BWP and TCI switching delay and has an extended variable added to existing $T_{BWPswitchDelay}$. In other words, $T_{BWPswitchDelay\_NTN}$=x+$T_{BWPswitchDelay}$, wherein x is a non-negative variable (e.g., x≥0).

In a third embodiment, the UE may receive the DL target TCI and BWP at the first slot that is after slot n+timeDurationForQCL_NTN, where timeDurationForQCL_NTN is the time required by the UE to perform PDCCH reception and applying spatial QCL information received in DCI for NTN an is an extended variable added to existing timeDurationForQCL. In other words, timeDurationForQCL$_{NTN}$=y+timeDurationForQCL where y is a non-negative variable (e.g., y≥0).

In a fourth embodiment, the UE may receive the DL target TCI and BWP at the first slot that is after slot n+T$_{BWPswitchDelay}$+timeDurationForQCL.

Exemplary Embodiments

The following descriptions provide exemplary embodiments corresponding to various embodiments described herein, e.g., such as corresponding to the method of FIGS. 6-12.

Example 1. A method, the method executable by a wireless device to establish communication with a network node; determine a relationship between transmission configuration indication (TCI) and bandwidth part (BWP); receive an indication of one of TCI or BWP from the network node; determine the other of TCI or BWP based on the indication and using the relationship between the TCI and BWP; and perform downlink communication using the indicated one of TCI or BWP and determined other TCI or BWP.

Example 2. The method of example 1, wherein the network node is comprised in a non-terrestrial network.

Example 3. The method of example 1, wherein the relationship between TCI and BWP is specified by the network node.

Example 4. The method of example 1, wherein the relationship between TCI and BWP is specified in radio resource control (RRC) signaling.

Example 5. The method of example 1, wherein the indication of the TCI or BWP is provided by downlink control information (DCI).

Example 6. The method of example 1, wherein the network node may configure an inactivity timer associated with a current BWP.

Example 7. The method of example 1, wherein the indication of the TCI or BWP is provided by medium access control (MAC) control element (CE).

Example 8. The method of example 1, wherein the indication of the TCI or BWP is provided based on radio resource control (RRC) signaling.

Example 9. The method of example 1, wherein upon receiving the indication of TCI, the wireless device is further configured to determine the BWP based on the indication of TCI and the relationship between the TCI and BWP.

Example 10. The method of example 1, wherein upon receiving the indication of BWP, the wireless device is further configured to determine the TCI based on the indication of BWP and the relationship between the BWP and TCI.

Example 11. The method of example 5, wherein performing downlink communication using the indicated one of TCI or BWP and determined other TCI or BWP occurs after the first slot after slot n+Max{T$_{BWPswitchDelay}$, timeDurationForQCL}.

Example 12. The method of example 5, wherein performing downlink communication using the indicated one of TCI or BWP and determined other TCI or BWP occurs at the first slot after slot n+T$_{BWPswitchDelay\_NTN}$.

Example 13. The method of example 5, wherein performing downlink communication using the indicated one of TCI or BWP and determined other TCI or BWP occurs at the first slot after slot n+timeDurationForQCL_NTN.

Example 14. The method of example 5, wherein performing downlink communication using the indicated one of TCI or BWP and determined other TCI or BWP occurs at the first slot after slot n+T$_{BWPswitchDelay}$+timeDurationForQCL.

Example 15. The method of example 6, wherein performing downlink communication using the indicated one of TCI or BWP and determined other TCI or BWP occurs at the first slot alter slot n+Max{T$_{BWPswitchDelay}$, timeDurationForQCL}.

Example 16. The method of example 6, wherein performing downlink communication using the indicated one of TCI or BWP and determined other TCI or BWP occurs at the first slot after slot n+T$_{BWPswitchDelay\_NTN}$.

Example 17. The method of example 6, wherein performing downlink communication using the indicated one of TCI or BWP and determined other TCI or BWP occurs at the first slot after slot n+timeDurationForQCL_NTN.

Example 18. The method of example 6, wherein performing downlink communication using the indicated one of TCI or BWP and determined other TCI or BWP occurs at the first slot after slot n+T$_{BWPswitchDelay}$+timeDurationForQCL.

Example 19. The method of example 7, wherein performing downlink communication using the indicated one of TCI or BWP and determined other TCI or BWP occurs at the first slot after slot $$n + T_{HARQ} + 3N_{slot}^{subframe,\mu} + \text{Max}\left\{T_{BWPswitchDelay}, TO_k * \frac{(T_{first-SSB} + T_{SSB-proc})}{NR\,slot\,length}\right\}$$

if the target TCI is known.

Example 20. The method of example 7, wherein performing downlink communication using the indicated one of TCI or BWP and determined other TCI or BWP occurs at the first slot after slot $$n + T_{HARQ} + 3N_{slot}^{subframe,\mu} + \text{Max}\left\{T_{BWPswitchDelay}, \left(T_{L1-RSRP} + TO_{uk} * \frac{(T_{first-SSB} + T_{SSB-proc})}{NR\,slot\,length}\right)\right\}$$

if the target TCI is unknown.

Example 21. The method of example 7, wherein performing downlink communication using the indicated one of TCI or BWP and determined other TCI or BWP occurs at the first slot after slot $$n + T_{HARQ} + 3N_{slot}^{subframe,\mu} + T_{BWPswitchDelay}, + TO_k * \frac{(T_{first-SSB} + T_{SSB-proc})}{NR\,slot\,length}$$

if the target TCI is known.

Example 22. The method of example 7, wherein performing downlink communication using the indicated one of TCI or BWP and determined other TCI or BWP occurs at the first slot after slot $$n + T_{HARQ} + 3N_{slot}^{subframe,\mu} + T_{BWPswitchDelay} + \left(T_{L1-RSRP} + TO_{uk} * \frac{(T_{first-SSB} + T_{SSB-proc})}{NR \text{ slot length}}\right)$$

if the target TCI is unknown.

Example 23. The method of example 8, wherein performing downlink communication using the indicated one of TCI or BWP and determined other TCI or BWP occurs at the first slot after slot $$n + T_{\frac{RRC\_processing}{NR \text{ slot length}}} + \frac{\text{Max}\{T_{BWPswitchDelayRRC}, TO_k(T_{first-SSB} + T_{SSB-proc})\}}{NR \text{ slot length}}$$

if the target TCI is known.

Example 24. The method of example 8, wherein performing downlink communication using the indicated one of TCI or BWP and determined other TCI or BWP occurs at the first slot after slot $$n + T_{\frac{RRC\_processing}{NR \text{ slot length}}} + \frac{\text{Max}\{T_{BWPswitchDelayRRC}, T_{L1-RSRP} + TO_{uk}(T_{first-SSB} + T_{SSB-proc})\}}{NR \text{ slot length}}$$

if the target TCI is unknown.

Example 25. The method of example 8, wherein performing downlink communication using the indicated one of TCI or BWP and determined other TCI or BWP occurs at the first slot after slot $$n + T_{\frac{RRC\_processing}{NR \text{ slot length}}} + \frac{\{T_{BWPswitchDelayRRC} + TO_k(T_{first-SSB} + T_{SSB-proc})\}}{NR \text{ slot length}}$$

if the target TCI is known.

Example 26. The method of example 8, wherein performing downlink communication using the indicated one of TCI or BWP and determined other TCI or BWP occurs at the first slot after slot $$n + T_{\frac{RRC\_processing}{NR \text{ slot length}}} + \frac{\{T_{BWPswitchDelayRRC} + T_{L1-RSRP} + TO_{uk}(T_{first-SSB} + T_{SSB-proc})\}}{NR \text{ slot length}}$$

if the target TCI is unknown.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, the network node may configure an inactivity timer associated with a current BWP such that when the UE performs downlink communication using the indicated one of TCI or BWP and determined other TCI or BWP occurs at the first slot after slot n+timeDurationForQCL_NTN. Additionally or alternatively, the UE may perform downlink communication using the indicated one of TCI or BWP and determined other TCI or BWP occurs at the first slot after slot n+$T_{BWPswitchDelay}$+timeDurationForQCL.

In some embodiments, when the indication of the TCI or BWP is provided by a medium access control (MAC) control element (CE), the UE may perform downlink communication using the indicated one of TCI or BWP and determined other TCI or BWP occurs at the first slot after slot $$n + T_{HARQ} + 3N_{slot}^{subframe,\mu} + \mathrm{Max}\left\{T_{BWPswitchDelay}, TO_k * \frac{(T_{first-SSB} + T_{SSB-proc})}{NR\ slot\ length}\right\}$$

if the target TCI is known. Additionally or alternatively, the UE may perform downlink communication using the indicated one of TCI or BWP and determined other TCI or BWP occurs at the first slot after $$\text{slot } n + T_{HARQ} + 3N_{slot}^{subframe,\mu} + \mathrm{Max}\left\{T_{BWPswitchDelay}, \left(T_{L1-RSRP} + TO_{uk} * \frac{(T_{first-SSB} + T_{SSB-proc})}{NR\ slot\ length}\right)\right\}$$

if the target TCI is unknown. According to some embodiments, the UE may perform downlink communication using the indicated one of TCI or BWP and determined other TCI or BWP occurs at the first slot after $$\text{slot } n + T_{HARQ} + 3N_{slot}^{subframe,\mu} + T_{BWPswitchDelay} + TO_k * \frac{(T_{first-SSB} + T_{SSB-proc})}{NR\ slot\ length}$$

if the target TCI is known. Additionally or alternatively, the UE may perform downlink communication using the indicated one of TCI or BWP and determined other TCI or BWP occurs at the first slot after $$\text{slot } n + T_{HARQ} + 3N_{slot}^{subframe,\mu} + T_{BWPswitchDelay} + \left(T_{L1-RSRP} + TO_{uk} * \frac{(T_{first-SSB} + T_{SSB-proc})}{NR\ slot\ length}\right)$$

if the target TCI is unknown.

In some embodiments, when the indication of the TCI or BWP is provided based on radio resource control (RRC) signaling, the UE may perform downlink communication using the indicated one of TCI or BWP and determined other TCI or BWP occurs at the first slot after $$\text{slot } n + \frac{T_{RRC\_processing}}{NR\ slot\ length} + \frac{\mathrm{Max}\{T_{BWPswitchDelayRRC}, TO_k(T_{first-SSB} + T_{SSB-proc})\}}{NR\ slot\ length}$$

if the target TCI is known. Additionally or alternatively, the UE may perform downlink communication using the indicated one of TCI or BWP and determined other TCI or BWP occurs at the first slot after $$\text{slot } n + \frac{T_{RRC\_processing}}{NR\ slot\ length} +$$

-continued $$\frac{\text{Max}\{T_{BWPswitchDelayRRC}, (T_{L1-RSRP} + TO_{uk}(T_{first-SSB} + T_{SSB-proc}))\}}{NR \text{ slot length}}$$

if the target TCI is unknown. According to some embodiments, the UE may perform downlink communication using the indicated one of TCI or BWP and determined other TCI or BWP occurs at the first slot after $$\text{slot } n + \frac{T_{RRC\_processing}}{NR \text{ slot length}} + \frac{\{T_{BWswitchDelayRRC} + TO_k(T_{first-SSB} + T_{SSB-proc})\}}{NR \text{ slot length}}$$

if the target TCI is known. Additionally or alternatively, the UE may perform downlink communication using the indicated one of TCI or BWP and determined other TCI or BWP occurs at the first slot after $$\text{slot } n + \frac{T_{RRC\_processing}}{NR \text{ slot length}} + $$

$$\frac{\{T_{BWPswitchDelayRRC} + T_{L1-RSRP} + TO_{uk}(T_{first-SSB} + T_{SSB-proc})\}}{NR \text{ slot length}}$$

if the target TCI is unknown.

What is claimed is:

1. A processor configured to:
   determine a relationship between transmission configuration indication (TCI) and bandwidth part (BWP);
   receive, via downlink control information (DCI), an indication of one of TCI or BWP from a network node;
   determine the other of TCI or BWP based on the indication and using the relationship between the TCI and BWP; and
   perform downlink communication using the indicated one of TCI or BWP and determined other TCI or BWP, wherein performing downlink communication using the indicated one of TCI or BWP and determined other TCI or BWP occurs after a first slot that is after a slot characterized by:
      slot n+Max{$T_{BWPswitchDelay}$, timeDurationForQCL}, wherein $T_{BWPswitchDelay}$ is a first time associated with a BWP switch delay and timeDurationForQCL is a second time associated with a user equipment (UE) performing PDCCH reception and applying spatial quasi-colocation (QCL) information received in the DCI.

2. The processor of claim 1, wherein the network node is comprised in a non-terrestrial network.

3. The processor of claim 1, wherein the relationship between TCI and BWP is specified by the network node.

4. The processor of claim 1, wherein the relationship between TCI and BWP is specified in radio resource control (RRC) signaling.

5. The processor of claim 1, wherein the network node may configure an inactivity timer associated with a current BWP.

6. The processor of claim 1, wherein the indication of the TCI or BWP is provided by a medium access control (MAC) control element (CE).

7. The processor of claim 1, wherein the indication of the TCI or BWP is provided based on radio resource control (RRC) signaling.

8. The processor of claim 1, wherein upon receiving the indication of TCI, the processor is further configured to determine the BWP based on the indication of TCI and the relationship between the TCI and BWP.

9. The processor of claim 1, wherein upon receiving the indication of BWP, the processor is further configured to determine the TCI based on the indication of BWP and the relationship between the BWP and TCI.

10. A method, comprising:
    determining a relationship between transmission configuration indication (TCI) and bandwidth part (BWP);
    receiving, via downlink control information (DCI), an indication of one of TCI or BWP from a network node;
    determining the other of TCI or BWP based on the indication and using the relationship between the TCI and BWP; and
    performing downlink communication using the indicated one of TCI or BWP and determined other TCI or BWP, wherein performing downlink communication using the indicated one of TCI or BWP and determined other TCI or BWP occurs after a first slot that is after a slot characterized by:
       slot n+Max {$T_{BWPswitchDelay}$, timeDurationForQCL}, wherein $T_{BWPswitchDelay}$ is a first time associated with a BWP switch delay and timeDurationForQCL is a second time associated with a user equipment (UE) performing PDCCH reception and applying spatial quasi-colocation (QCL) information received in the DCI.

11. The method of claim 10, wherein performing downlink communication using the indicated one of TCI or BWP and determined other TCI or BWP occurs at a first slot after a slot characterized by:
    slot n+$T_{BWPswitchDelay\_NTN}$, wherein $T_{BWPswitchDelay\_NTN}$ is a BWP and TCI switching delay corresponding to an extended variable added to $T_{BWPswitchDelay}$.

12. The method of claim 10, wherein performing downlink communication using the indicated one of TCI or BWP and determined other TCI or BWP occurs at a first slot after a slot characterized by:
    slot n+timeDurationForQCL_NTN, wherein timeDurationForQCL_NTN is a time associated with the UE performing PDCCH reception and applying spatial QCL information received in DCI for NTN and corresponds to an extended variable added to timeDurationForQCL.

13. The method of claim 10, wherein performing downlink communication using the indicated one of TCI or BWP and determined other TCI or BWP occurs at a first slot after a slot characterized by:
    slot n+$T_{BWPswitchDelay}$+timeDurationForQCL.

14. A method, comprising:
    transmitting, via downlink control information (DCI), an indication of one of transmission configuration indication (TCI) or bandwidth part (BWP) to a user equipment (UE),
    wherein the indicated one of TCI or BWP is usable by the UE in:
       determining a relationship between the TCI and BWP;
       determining the other of TCI or BWP based on the indication and using the relationship between the TCI and BWP; and
       performing downlink communication with a network node using the indicated one of TCI or BWP and determined other TCI or BWP, wherein performing downlink communication using the indicated one of TCI or BWP and determined other TCI or BWP occurs after a first slot that is after a slot characterized by:

slot n+Max{$T_{BWPswitchDelay}$, timeDurationForQCL}, wherein $T_{BWPswitchDelay}$ is a first time associated with a BWP switch delay and timeDurationForQCL is a second time associated with a user equipment (UE) performing PDCCH reception and applying spatial quasi-colocation (QCL) information received in the DCI.

15. The method of claim 14, further comprising:
configuring an inactivity timer associated with a current BWP.

16. The method of claim 14, wherein the downlink communication with the network node is performed using the indicated one of TCI or BWP and determined other TCI or BWP occurs at a first slot after a slot characterized by:

slot n+$T_{BWPswitchDelay\_NTN}$, Wherein $T_{BWPswitchDelay\_NTN}$ is a BWP and TCI switching delay corresponding to an extended variable added to $T_{BWPswitchDelay}$.

17. The method of claim 14, wherein performing downlink communication using the indicated one of TCI or BWP and determined other TCI or BWP occurs at a first slot after a slot characterized by:

slot n+timeDurationForQCL_NTN, wherein timeDurationForQCL_NTN is a time associated with the UE performing PDCCH reception and applying spatial QCL information received in DCI for NTN and corresponds to an extended variable added to timeDurationForQCL.

18. The method of claim 14, wherein performing downlink communication using the indicated one of TCI or BWP and determined other TCI or BWP occurs at a first slot after a slot characterized by:

slot n+$T_{BWPswitchDelay}$+timeDurationForQCL.

19. The method of claim 14, wherein the network node is comprised in a non-terrestrial network.

20. The method of claim 14, wherein the relationship between TCI and BWP is specified in radio resource control (RRC) signaling.

* * * * *